US005132604A

United States Patent [19]

Shimane et al.

[11] Patent Number: 5,132,604

[45] Date of Patent: Jul. 21, 1992

[54] ENGINE STARTER AND ELECTRIC GENERATOR SYSTEM

[75] Inventors: Iwao Shimane, Saitama; Yoshio Kojima, Tokyo; Toshio Yokoyama; Sadao Shinohara, both of Saitama, all of Japan

[73] Assignee: Honda Giken Kogyo Kabushiki Kaisha, Tokyo, Japan

[21] Appl. No.: 498,050

[22] Filed: Mar. 22, 1990

[30] Foreign Application Priority Data

Apr. 4, 1989 [JP] Japan .................................... 1-85202
Apr. 4, 1989 [JP] Japan .................................... 1-85207
Apr. 4, 1989 [JP] Japan .................................... 1-85208

[51] Int. Cl.[5] ...................... F02N 11/04; H02K 23/52
[52] U.S. Cl. ........................................... 322/10; 290/46
[58] Field of Search .................. 322/10, 11; 290/46 R

[56] References Cited

U.S. PATENT DOCUMENTS 1,770,468 7/1930 Ford ................................ 290/46 X
3,006,221 10/1961 Cromwell .......................... 290/46 X
3,617,762 11/1971 Price et al. ............................ 290/46
4,330,743 5/1982 Glennon ................................ 322/10
4,743,776 5/1988 Baehler ............................ 290/46 X
4,948,997 8/1990 Ohmitsu et al. .................. 322/11 X
4,959,595 9/1990 Nishimura ........................ 290/46 X

FOREIGN PATENT DOCUMENTS 63-41667 of 0000 Japan .
63-202255 of 0000 Japan .

*Primary Examiner*—R. J. Hickey
*Attorney, Agent, or Firm*—Lyon & Lyon

[57] ABSTRACT

An engine starter and electric generator system transmits rotative power to a crankshaft to start an engine and generates electric power based on rotative power from the crankshaft after the engine has started. The engine starter and electric generator system includes a starter/generator operable selectively as a starter motor to produce the rotative power and a generator for generating the electric power, and an electric power supply device for supplying electric power to the starter motor. A power transmitting mechanism operatively interconnects the crankshaft and the starter/generator, for bidirectionally transmitting the rotative power between the crankshaft and the starter/generator. A transmission mechanism is disposed in the power transmitting mechanism, for changing the speed of rotation transmitted between the crankshaft and the starter/generator. The system also has a control device for controlling operation of the starter/generator and establishing different speed-reduction ratios for the transmission mechanism when the starter/generator operates as the generator and when the starter/generator operates as the starter motor.

18 Claims, 9 Drawing Sheets

ENGINE STARTER AND ELECTRIC GENERATOR SYSTEM

BACKGROUND OF THE INVENTION

1. Field of the Invention

The present invention relates to an engine starter and electric generator system.

2. Description of the Relevant Art

Engines are usually associated with a starter motor which is energized by a battery as a power supply and an electric generator which charges the battery and supplies electric power to electric parts. The starter motor and the electric generator are costly to manufacture since each of their rotor and stator requires an expensive winding. Automotive engines are also associated with accessories such as an oil pump, a compressor, etc., as well as the starter motor and the electric generator, around an outer end of the crankshaft. Therefore, it is desirable to make compact the structure around the crankshafts of the automotive engines.

Japanese Laid-Open Patent Publication No. 63(1988)-202255 proposes a starter/generator which can operate selectively as a starter motor and an electric generator, so that the structure around the crankshaft of an engine is simplified and the cost of the engine is reduced. The disclosed starter/generator has a rotor directly coupled to the crankshaft and includes a housing which accommodates an armature coil connected to the driver circuit for the starter motor and a field coil connected to the rectifier circuit for the generator.

Generally, the ratio of the rotational speed of the rotor to the rotational speed of the crankshaft, as determined from the characteristics of a starter, is different from the ratio of the rotational speed of the rotor to the rotational speed of the crankshaft, as determined from the characteristics of an electric generator. With the starter/generator which is selectively operable as the starter motor and the generator, since the rotor is directly connected to the crankshaft and the ratio of the rotor speed to the crankshaft shaft remains constant, the characteristics of the starter/generator as both the starter and the generator cannot effectively be utilized fully.

An inverter circuit comprising power switching elements connected in a bridge form is known as an electric power supply for a starter motor. For example, Japanese Laid-Open Patent Publication No. 63(1988)-41667 discloses an inverter device composed of six power MOSFETs (metal-oxide semiconductor field-effect transistors) for driving a three-phase motor.

The disclosed inverter device includes a current-detecting resistor inserted in series with the power switching elements. When an overcurrent is detected on the basis of a voltage across the current-detecting resistor, gate driving voltages applied from a commutation logic circuit are cut off.

With the current-detecting resistor inserted in the path for supplying an electric current to the starter motor, however, the electric power supplied to starter motor is reduced by the electric power consumed by the inserted resistor, and hence the inverter device is not efficient enough. Since the gate driving voltage for the power switching elements is cut off when an overcurrent is detected, any failure caused by a short circuit of a certain power switching element can be detected only while the motor is in operation. If an FET connected to a positive power supply terminal and an FET connected to a negative power supply terminal are simultaneously shorted out, then any overcurrent cannot be cut off even when the gates are disabled. Therefore, the FETs will be excessively heated, a condition which is not desirable from the standpoint of safety, and also a wasteful consumption of electric power results.

A replaceable battery is used as the DC power supply for the inverter device. Should the battery be connected to the inverter device with the wrong polarities at the time of battery replacement or maintenance, the power switching elements may be damaged or degraded in characteristics.

SUMMARY OF THE INVENTION

It is an object of the present invention to provide an engine starter and electric generator system which has matched characteristics as a starter and a generator, can operate as a starter and a generator with maximum efficiency, and can effectively transmit the starting torque of a starter motor to the crankshaft of an engine when the engine is to be started, for thereby reducing electric power consumption.

Another object of the present invention is to provide an electric power supply device which can detect an overcurrent without a reduction in electric power supplied to a starter motor, and can cut off an electric current supplied from a DC power supply if power switching elements cannot be controlled so that they are turned on and off.

Still another object of the present invention is to provide an electric power supply device which will detect a failure of power switching elements in an inverter circuit while the inverter circuit is being disabled, thereby cutting off the supply of electric power to the inverter circuit.

According to the present invention, there is provided an engine starter and electric generator system for transmitting rotative power to a crankshaft to start an engine and generating electric power based on rotative power from the crankshaft, comprising a starter/generator operable selectively as a starter motor to produce the rotative power and a generator for generating the electric power, electric power supply means for supplying electric power to the starter motor, power transmitting means operatively interconnecting the crankshaft and the starter/generator, for bidirectionally transmitting the rotative power between the crankshaft and the starter/generator, a transmission mechanism disposed in the power transmitting mechanism, for changing the speed of rotation transmitted between the crankshaft and the starter/generator, and control means for controlling operation of the starter/generator and establishing different speed-reduction ratios for the transmission mechanism when the starter/generator operates as the generator and when the starter/generator operates as the starter motor, respectively.

Since the different speed-reduction ratios are established for the transmission mechanism when the starter motor is energized and when the generator generates electric power, the characteristics of rotational speeds of the starter motor and the generator with respect to the crankshaft can easily be matched without any modification of the starter motor or the generator.

The starter motor starts being energized after the speed-reduction ratio has been established for the transmission mechanism. Accordingly, the starting torque of the starter motor can effectively be transmitted to the crankshaft, and the time required to energize the starter motor which has to be supplied with a large current is shortened. As a result, the electric power needed to energize the starter motor is reduced.

The electric power supply means for the starter motor includes a current detecting means for detecting a current supplied from a DC power supply such as a battery based on a voltage produced across a cable which interconnects the DC power supply and an inverter device, and a current cut-off means for opening a relay interposed between the DC power supply and power switching elements if the detected current is in excess of a predetermined current.

The electric power supply means alternatively includes an operation control circuit for detecting a voltage applied to windings of the starter motor while power switching elements are being de-energized, and for cutting off the supply of electric power to the inverter device if the detected voltage falls outside a predetermined voltage range.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

An engine starter and electric generator system according to an embodiment of the present invention will hereinafter be described with reference to FIGS. 1 through 4.

Figure 1:
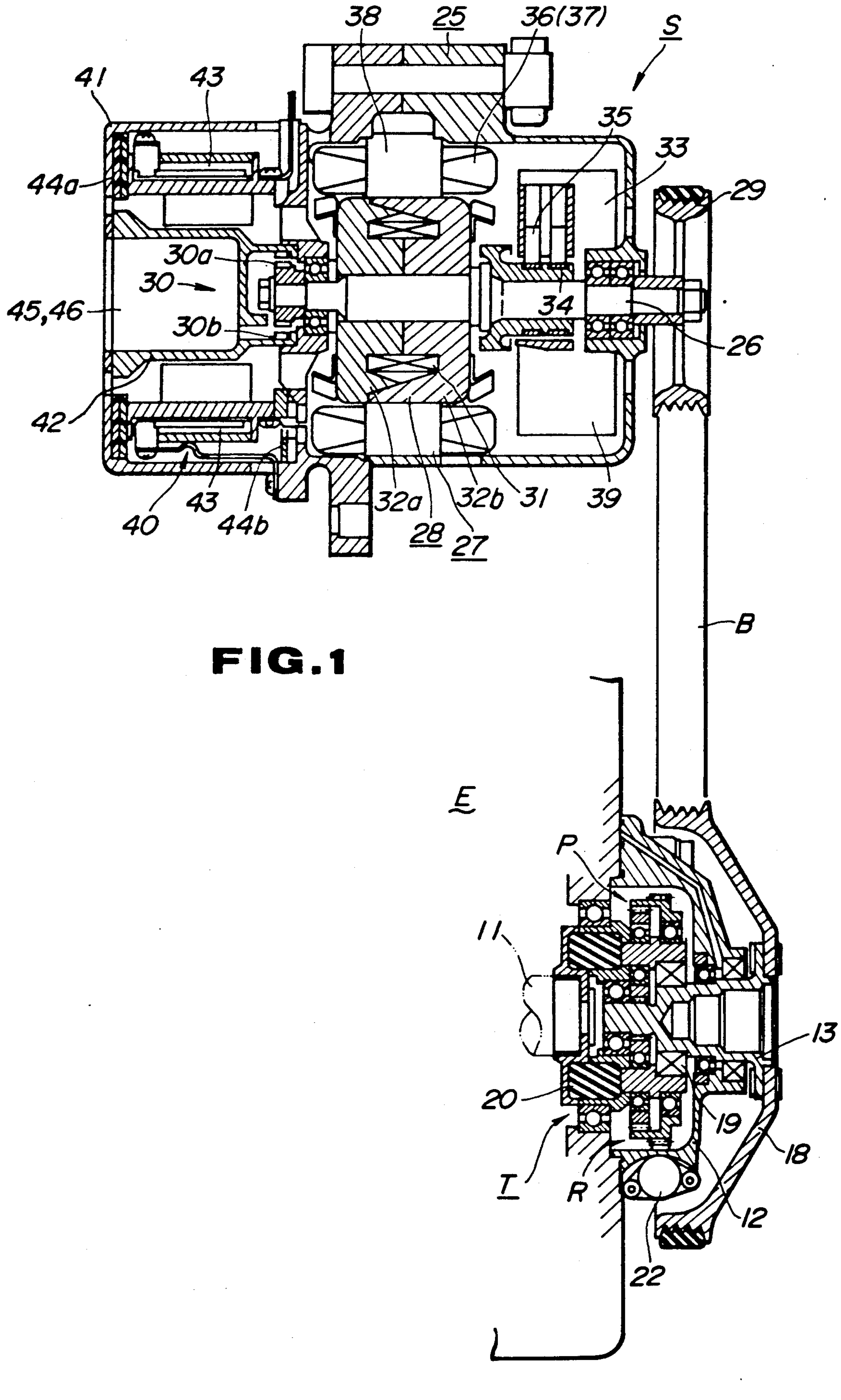
FIG. 1 is a cross sectional view of an engine starter and electric generator system according to an embodiment of the present invention.

As shown in FIG. 1, a transmission mechanism T is mounted on an outer wall surface of the crankcase of an engine E. The transmission mechanism T has an input/output shaft 13 with a pulley 18 mounted thereon. A belt B is trained around the pulley 18 and a pulley 29 of a starter/generator S. The belt B and the pulleys 18, 29 jointly serve as a power transmitting mechanism. Rotative power from the crankshaft 11 is transmitted to the starter/generator S by the transmission mechanism T and the power transmitting mechanism. Likewise, rotative power from the starter/generator S is also transmitted to the crankshaft 11 by the power transmitting mechanism and the transmission mechanism T.

Figure 2B:
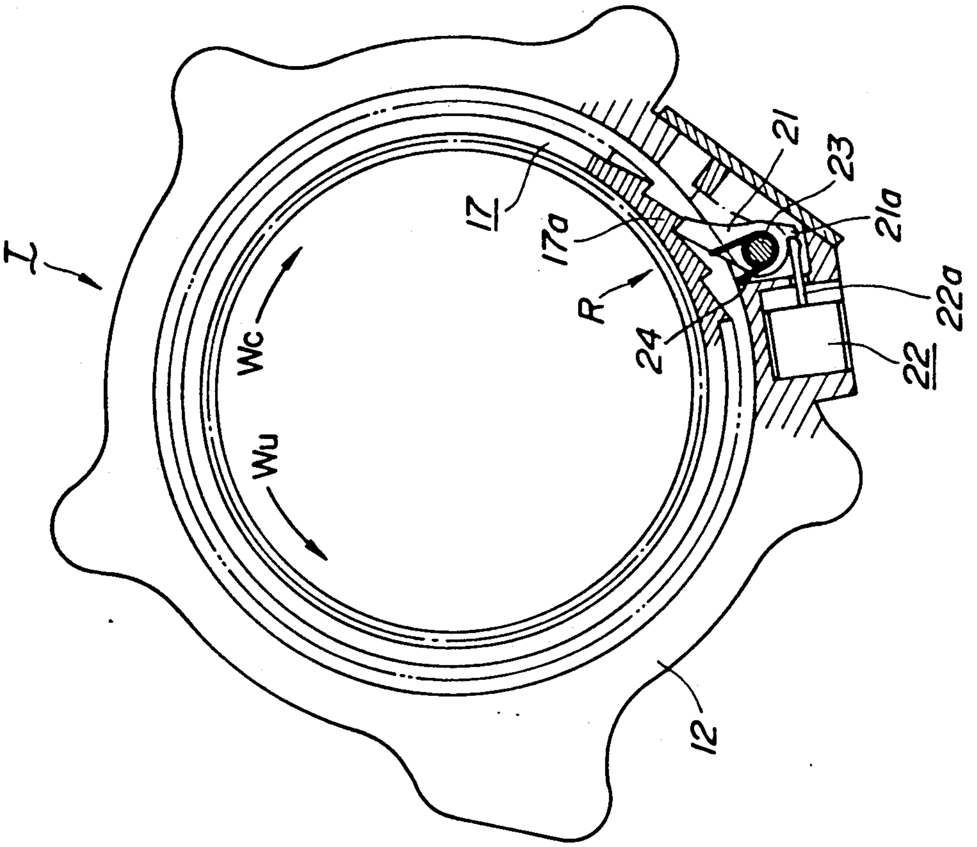
FIG. 2b is a side elevational view, partly in cross section, of the transmission mechanism.
Figure 2A:
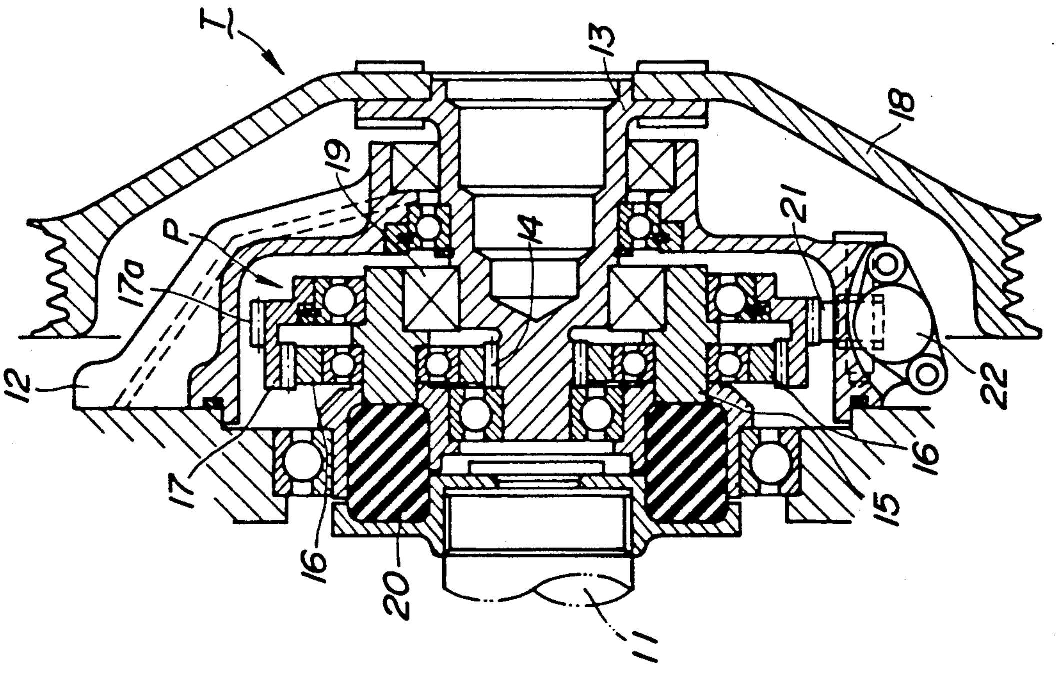
FIG. 2a is an enlarged cross-sectional view of a transmission mechanism.

The transmission mechanism T is illustrated in detail in FIGS. 2a and 2b. The transmission mechanism T has a housing 12 fixed to the outer wall surface of the crankcase, and the input/output shaft 13 is rotatably supported in the housing 12 and disposed coaxially with the crankshaft 11. The crank pulley 18 is fixedly mounted on an end of the input/output shaft 13 which projects from the housing 12. The belt B is trained around the pulley 18, as described above. A planetary gear mechanism P comprising a sun gear 14, a carrier 15, planet gears 16, and a ring gear 17 is accommodated in the housing 12 in concentric relation to the input/output shaft 13. The sun gear 14 is integrally formed with the end of the input/output shaft 13. The planet gears 16 meshes with the sun gear 14 and is rotatably supported on the carrier 15. Between the righthand end of the carrier 15 and the input/output shaft 13, there is disposed a one-way clutch 19 for allowing the rotative power to be transmitted only from the carrier 15 to the input/output shaft 13. The lefthand end of the carrier 15 is connected to the crankshaft 11 through a resilient body 20.

As shown in FIG. 2b, the outer peripheral surface of the ring gear 17 has a plurality of sawtooth-shaped engageable teeth (engageable portion) 17a. A locking pawl 21 is swingably supported in the housing 12 by a pin 23 and has a tip end which can lockingly engage engageable teeth 17a of the ring gear 17. The locking pawl 21 is normally urged to move its tip end out of engagement with the teeth 17a by a torsion spring 24 coiled around the pin 23. The engageable teeth 17a of the ring gear 17, the locking pawl 21, and the torsion spring 24 jointly constitute a ratchet mechanism R.

Figure 3:
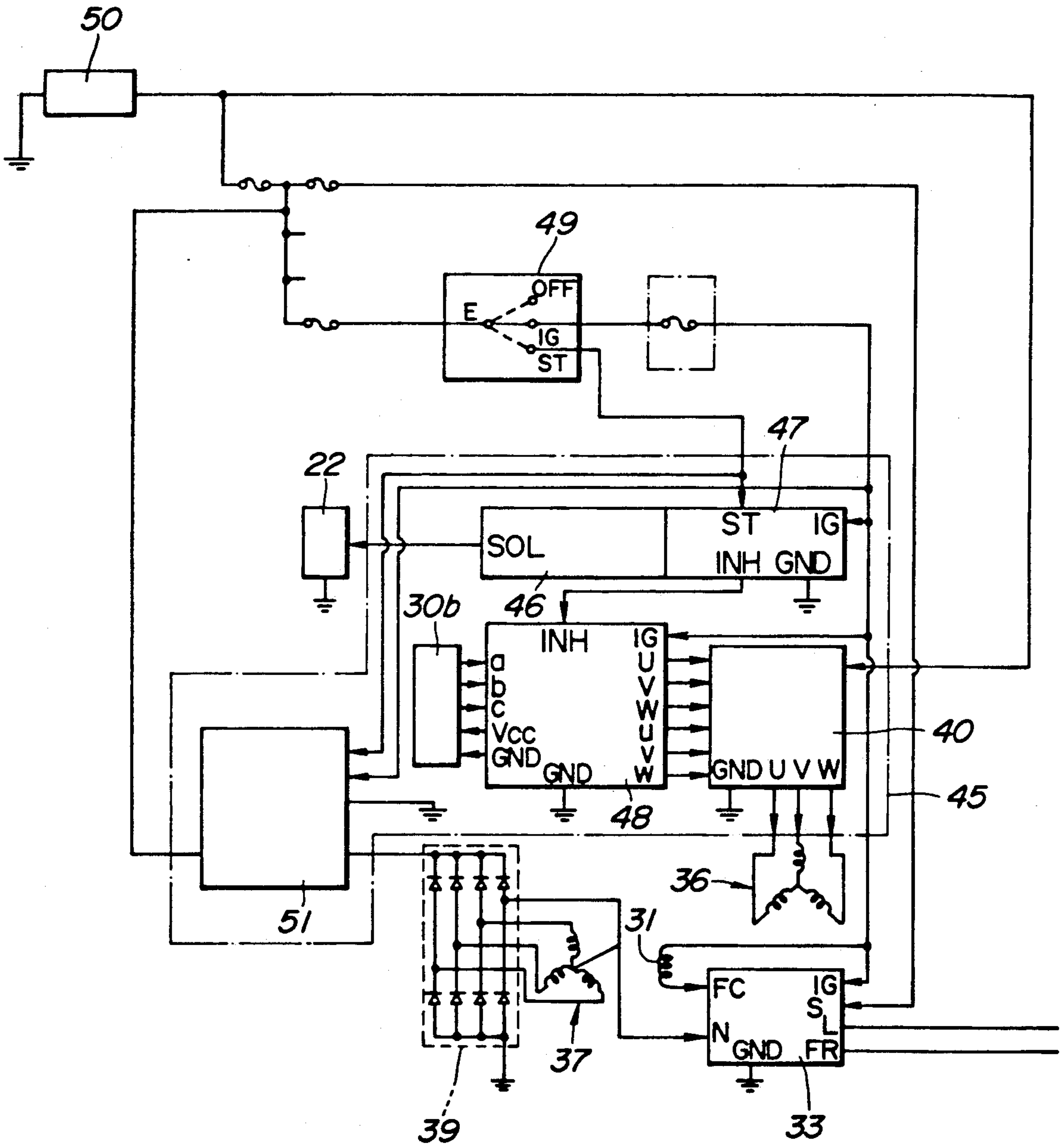
FIG. 3 is a block diagram of a control device.

A solenoid-operated actuator 22 is fixed to the housing 12 and has a built-in solenoid electrically connected to a solenoid driver circuit 46 shown in FIG. 3. The solenoid-operated actuator 22 has a plunger 22a abutting against a projection on the proximal end of the locking pawl 21. When the solenoid-operated actuator 22 is operated, the plunger 22a pushes the locking pawl 21 in a direction to bring the tip end thereof into engagement with the teeth 17a under a force dependent on the magnitude of an electric current which is supplied from the solenoid driver circuit 46 to the solenoid.

When the locking pawl 21 engages the teeth 17a, the ring gear 17 is permitted to rotate only in the direction indicated by the arrow Wu, but is prevented from rotating in the direction indicated by the arrow Wc. The ring gear 17 is rotated in the direction indicated by the arrow Wc when rotative power is transmitted from the input/output shaft 13. The ring gear 17 is rotated in the direction indicated by the arrow Wu when rotative power is transmitted from the crankshaft 11.

When the locking pawl 21 engages the teeth 17a to lock the ring gear 17 against rotation in the direction indicated by the arrow Wc, the planetary gear mechanism P reduces the rotational speed of the input/output shaft 13 and transmits the speed-reduced rotative power to the crankshaft 11. When the rotative power is transmitted from the crankshaft 11 to the carrier 15, since the ring gear 17 is allowed by the ratchet mechanism R to idly rotate in the direction indicated by the arrow Wu even if the locking pawl 21 engages the teeth 17a, the rotative power from the crankshaft 11 is not transmitted to the input/output shaft 13 through the planet gear mechanism P, but transmitted from the carrier 15 through the one-way clutch 19 to the input/output shaft 13 without any speed reduction (transmission or speed-reduction ratio of 1:1).

In FIG. 1, the housing 25 of the starter/generator S is secured to the engine E. A rotor 28 is housed in the housing 25 and supported on a rotor shaft 26 which is rotatably supported in the housing 25. A stator 27 is mounted on a central inner wall surface of the housing 25 in radially confronting relation to the rotor 28.

The pulley 29 is fixedly mounted on the righthand end of the rotor shaft 26 which projects out of the housing 25. A plurality of permanent magnets 30*a* are fixedly mounted on the lefthand end of the rotor shaft 26. The rotor 28 comprises a field coil 31 and a pair of yokes 32*a*, 32*b* surrouding the field coil 31 and combined with each other in an interdigitating fashion. When the field coil 31 is energized, a number of circumferentially alternate magnetic poles are generated on the outer peripheries of the yokes 32*a*, 32*b*. The field coil 31 is electrically connected through slip rings 34 and brushes 35 to a voltage regulator 33 which is disposed on the righthand side (in FIG. 1) of the stator 27.

The stator 27 comprises a starter coil 36 and a generator coil 37, each of a three-phase winding arrangement, mounted on a yoke 38 as a distributed winding in the circumferential direction. The generator coil 37 is connected to a rectifier circuit 39 disposed on the righthand side (FIG. 1) of the stator 27, and the starter coil 36 is connected to a motor driver circuit 40 disposed on the lefthand side (FIG. 1)of the stator 27.

A substantially cylindrical cover 41 is fastened to an outer surface of the housing 25, and houses a substantially cylindrical sleeve 42 coaxial with the cover 41. The cover 41 and the sleeve 42 define therebetween a substantially annular space opening at one end into the exterior space and at the other end into the housing 25. The motor driver circuit 40 which comprises six power modules 43 is disposed in the annular space. The power modules 43 have axially opposite ends supported on the cover 41 and the housing 25 by support plates 44*a*, 44*b*, and are concentrically disposed in a hexagonal pattern in the annular space. Each of the power modules 43 comprises a substantially plate-like casing made of an electrically and thermally conductive material and having a large thermal capacity, and a switching element such as a MOSFET, for example, directly mounted on the casing. The power modules 43 are connected as a three-phase bridge circuit to three terminals of the starter coil 36. Three Hall-effect devices 30*b* are fixedly mounted on the inner wall surface of the end of the sleeve 42 near the housing 25, and disposed in close proximity to the permanent magnets 30*a* fixed to the rotor shaft 26. A control circuit 45 and a solenoid driver circuit 46 are housed in the sleeve 42. The Hall-effect devices 30*b* apply a signal to the control circuit 45 in response to detection of magnetic fluxes of the permanent magnet 30*a*. The permanent magnets 30*a* and the Hall-effect devices 30*b* jointly serve as a rotor position sensor 30 for detecting the angular position of the rotor 28.

Figure 4:
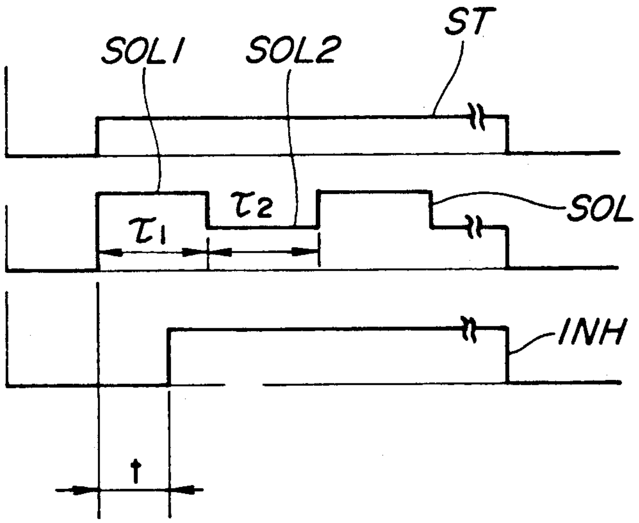
FIG. 4 is a timing chart of operation of the control device.

As shown in FIG. 3, the control circuit 45 comprises a delay circuit 47, the solenoid driver circuit 46 combined with the delay circuit 47, a motor control circuit 48, and the motor driver circuit 40. The delay circuit 47 has an input terminal ST connected to a start terminal ST of an ignition key switch 49, and an output terminal INH connected to an input terminal INH of the motor control circuit 48. When a start signal ST is applied to the input terminal ST of the delay circuit 47, the delay circuit 47 applies a speed-change signal SOL to the solenoid driver circuit 46, and also applies a start signal INH from the output terminal INH to the motor control circuit 48. As shown in FIG. 4, the speed-change signal SOL is of a rectangular periodic wave composed of higher-potential rectangular waves SOL1 each having given duration $\tau 1$ and lower-potential rectangular waves SOL2 each having a given duration $\tau 1$. The start signal INH is of a rectangular wave having a positive-going edge that occurs a time delay t after the positive-going edge of the speed-change signal SOL, and that exists within the first higher-potential duration $\tau 1$ of the speed change signal SOL. These signals SOL, INH are continuously produced by the delay circuit 47 as long as the start signal ST is applied to the delay circuit 47. The solenoid driver circuit 46 supplies the solenoid of the solenoid-operated actuator 22 with a larger current in the higher-potential duration $\tau 1$ and a smaller current in the lower-potential duration $\tau 2$, depending on the potential of the speed-change signal SOL from the delay circuit 47.

The ignition key switch 49 has a terminal E connected to a battery 50, an output terminal IG, the start terminal ST, and an turn-off terminal OFF. When the ignition key is turned, the ignition key switch 49 connects the terminals IG, ST to the terminal E to start the engine. After the engine has been started and while the engine is in operation, the ignition key switch 49 connects the terminal IG to the terminal E.

The motor control circuit 48 has input terminals a, b, c, vcc, GND connected to the three Hall-effect devices 30*b*, and terminals U, v, W, u, v, w connected to the motor driver circuit 40. A Hall voltage is applied from the terminals Vcc, GND to the Hall-effect devices 30*b*, and detected signals are supplied from the Hall-effect devices 30*b* to the terminals a, b, c. Only while the start signal INH is being applied to the terminal INH, the motor control circuit 48 applies drive signals to produce predetermined three-phase currents from the terminals U, V, W, u, v, w to the motor driver circuit 40. In the motor driver circuit 40, the signals from the terminals U, v, W, u, v, w are applied to the gates of the FETs of the six power modules 43, which supply three-phase currents to the starter coil 36 of the stator 27 in a phase corresponding to the angular position of the shaft 26. Each of the circuits 47, 48 has a power supply terminal IG connected to the output terminal IG of the ignition key switch 49. Each of the circuits 47, 48, 40 has a terminal GND which is grounded.

FIG. 3 also shows the field coil 31, the voltage regulator 33, the generator coil 37, and the rectifier circuit 39. The rectifier circuit 39 is connected to the battery 50 through a relay 51. The relay 51 is connected to the start terminal ST of the ignition switch 49. Responsive to the start signal ST, the relay 51 disconnects the rectifier circuit 39 from the battery 50, and keeps the rectifier circuit 49 disconnected from the battery 50 while the start signal ST is being supplied.

Operation of the engine starter and electric generator system of the above embodiment will be described below.

When the ignition key is turned to a start position, the terminals E, ST of the ignition key switch 49 are connected to each other, applying a start signal ST to the delay circuit 47. The delay circuit 47 applies a speed-change signal SOL to the solenoid driver circuit 46 and a start signal INH to the motor control circuit 48 with a time delay t. In synchronism with the speed-change signal SOL, the solenoid driver circuit 46 energizes the solenoid of the solenoid-operated actuator 22. Thereafter, the motor control circuit 48 applies a drive signal to the motor driver circuit 40 in synchronism with the start signal INH. When the solenoid-operated actuator 22 is operated, the locking pawl 21 of the ratchet mechanism R engages the teeth 17*a* of the ring gear 17, locking the ring gear 17 against rotation in the direction indicated by the arrow Wc. The transmission mechanism T is now shifted to a transmission or speed-reduction ratio with which the planetary gear mechanism P reduces the rotational speed of the rotative power supplied from the starter/generator S. After elapse of the time t, the starter coil 36 of the starter/generator S is energized to produce a starting torque. Therefore, the output power of the starter/generator S is effectively utilized, and any electric power loss at the time of starting the engine is greatly reduced.

When the engine is started, the solenoid driver circuit 46 changes the magnitude of the current supplied to the solenoid-operated actuator 22 depending on the potential of the speed-change signal SOL, such that the magnitude of the current supplied to the solenoid-operated actuator 22 is larger when the speed-change signal SOL is of a higher potential and is smaller when the speed-change signal SOL is of a lower potential. Therefore, the force with which the solenoid-operated actuator 22 operates the locking pawl 21 is larger when the speed-change signal SOL is of a higher potential and is smaller when the speed-change signal SOL is of a lower potential. As a result, even if the rotational speed of the crankshaft 11 of the engine E becomes temporarily higher than the rotational speed of the output shaft 13, causing the ring gear 17 to rotate in the direction indicated by the arrow Wu (FIG. 2*b*) while the ignition key is being turned to the start position, i.e., while the start signal ST is being applied, the locking pawl 21 remains in engagement with the teeth 17*a*, and the ring gear 17 is allowed to rotate in the direction indicated by the arrow Wu. The electric power consumed by the solenoid-operated actuator 22 is reduced, and at the same time the engine E is reliably started. The starter coil 36 starts being energized in the duration $\tau 1$ in which the locking pawl 21 is urged under a higher force by the solenoid-operated actuator 22. Consequently, even if the locking pawl 21 is not yet held in engagement with the teeth 17*a* at the time of starting to energize the solenoid-operated actuator 22, the locking pawl 21 is forcibly brought into reliable engagement with the teeth 17*a*. Since the starter coil 36 is subsequently energized, the rotative power from the starter/generator S is reliably reduced in speed and transmitted to the crankshaft 11.

When the engine E is started and the ignition key is returned from the start position, the relay 51 is energized to connect the rectifier circuit 39 to the battery 50, and at the same time the solenoid of the solenoid operated actuator 22 is de-energized, thus releasing the ring gear 17 of the planetary gear mechanism P. At this time, the transmission mechanism T does not change the speed of rotation of the crankshaft 11, but transmits the rotative power of the crankshaft 11 through the one-way clutch 19 to the starter/generator S at the speed-reduction ratio of 1. The generator coil 37 of the starter/generator S now generates three-phase AC power which is rectified by the rectifier circuit 39.

As described above, when the starter/generator S operates as an engine starter, the speed of rotation of the rotor 28 of the starter/generator S is reduced by the transmission mechanism T, and the speed-reduced rotative power is transmitted to the crankshaft 11. When the starter/generator S operates as an electric generator, the rotative power from the crankshaft 11 is not reduced in speed, but is directly transmitted to the rotor 28. Therefore, it is not necessary to match the characteristics of the rotational speed of the starter with respect to the rotational speed of the crankshaft with the characteristics of the rotational speed of the generator with respect to the rotational speed of the crankshaft. The starter/generator S can function efficiently as both the starter and generator. The circuit arrangement which is employed is simple.

While the planetary transmission mechanism T and the starter/generator S are illustrated in the above embodiment, another known transmission mechanism and starter/generator may be employed.

The starter/generator of the present invention can fully make use of its characteristics as the starter and the generator. The starting torque of the starter is effectively utilized, and the electric power consumption is reduced.

Inverter-type electric power supply devices suitable for use as electric power supply means for supplying electric power to the starter/generator will be described below with reference to FIGS. 5 through 7.

Figure 5:
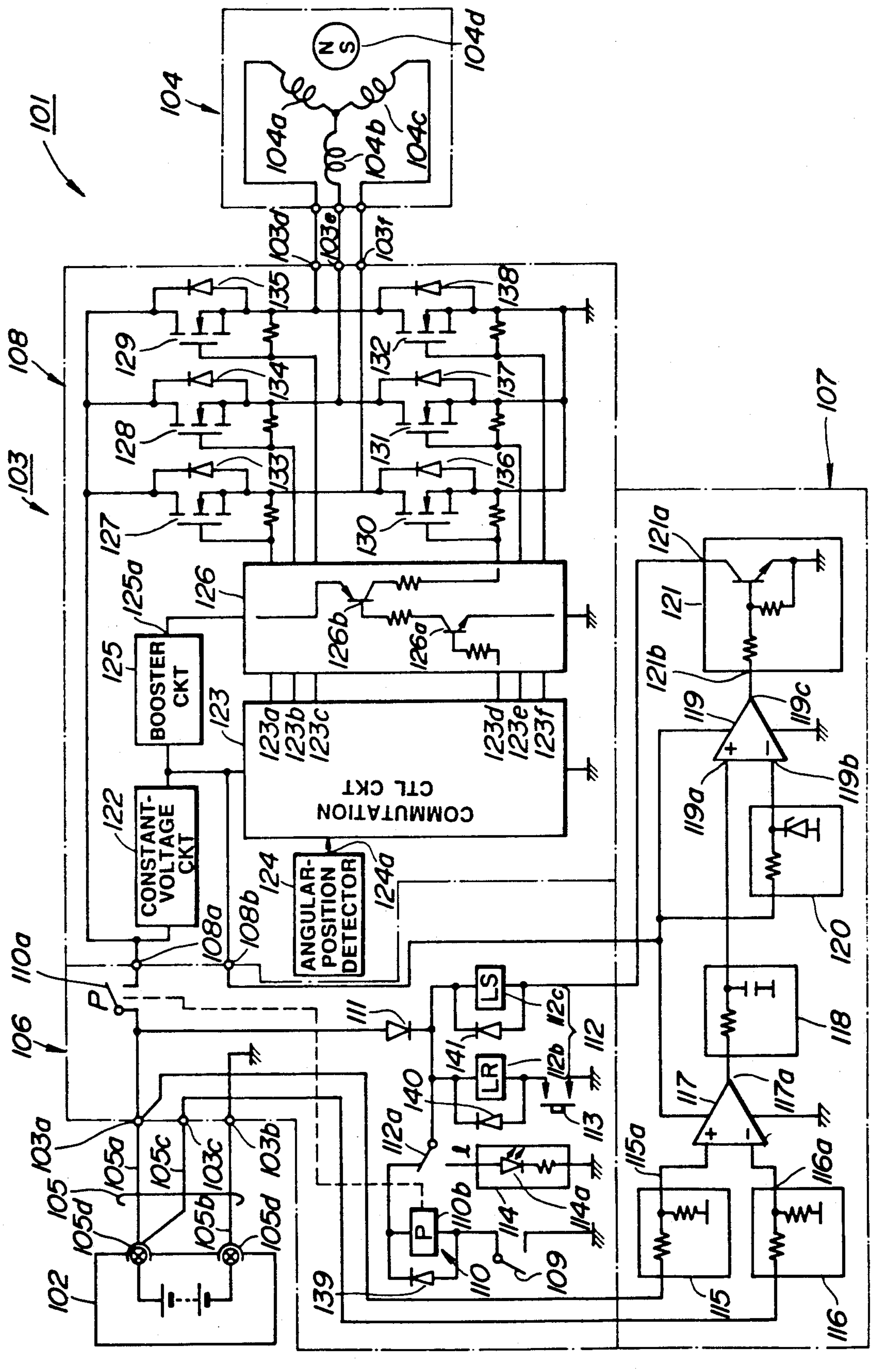
FIG. 5 is a circuit diagram, partly in block form, of an electric power supply device for a starter motor.

As shown in FIG. 5, an electric power supply device 101 comprises a battery 102 mounted on a motor vehicle, an inverter device 103, and a cable 105 interconnecting the battery 102 and the inverter device 103.

The cable 105 is of a three-core cable comprising power supply cords 105*a*, 105*b* connected to the positive and negative terminals of the battery 102, and a voltage detecting cord 105*c*. The positive-terminal power supply cord 105*a* and the voltage detecting cord 105*c* are connected to a terminal 105*d* of the battery 102.

The inverter device 103 comprises a relay circuit 106, a current detecting circuit 107, and an inverter circuit 108. The inverter device 103 has a positive power supply input terminal 103*a*, a negative power supply input terminal 103*b* (GND terminal), and a voltage-drop detecting input terminal 103*c* for detecting a voltage drop across the positive-terminal power supply cord 105*a*.

The relay circuit 106 has a relay 110 which is operated when a starter switch 109 is closed. The relay 110 has a contact 110*a* through which electric power from the battery 102 is supplied to a positive power supply terminal 108*a* of the inverter circuit 108. The relay 110 also has a winding 110*b* to which the voltage of the battery 102 is applied through a diode 111 and a contact 112*a* of a latching relay 112.

The latching relay 112 has a recovery winding 112*b* and an operating winding 112*c* to both of which the voltage of the battery 102 is applied through the diode 111. When a recovery switch 113 is closed, the contact 112*a* of the relay 112 is shifted to the illustrated position. The operating winding 112*c* is connected to an output terminal 121*a* of a latching relay driver circuit 121. When an electric current flows through the operating winding 112*c*, the contact 112*a* of the relay 112 is shifted from the illustrated position toward an indicator circuit 114. A light-emitting diode 114*a* of the indicator circuit 114 is energized, and the relay 110 is de-energized.

The current detecting circuit 107 comprises voltage dividers 115, 116 for dividing the voltages at the terminals 105*a*, 105*c*, and a differential amplifier 117 whose input terminals are connected to the output terminals 115*a*, 116*a* of the voltage dividers 115, 116. The differential amplifier 117 has an output terminal 117*a* through a low-pass filter 118 to an input terminal 119*a* of a voltage comparator 119. The voltage comparator 119 has a reference input terminal 119*b* to which a reference voltage from a reference voltage generator 120 is applied. The voltage comparator 119 has an output terminal coupled to an input terminal 121*b* of the latching relay driver circuit 121.

The inverter circuit 108 has a constant-voltage regulated power supply circuit 122 which supplies an electric current at a constant voltage to a commutation control circuit 123 and through a terminal 108*b* to the current detecting circuit 107.

The commutation control circuit 123, responsive to a detected angular-position signal 124*a* from an angular-position detector 124 for detecting the angular position of a motor 104, controls energization and de-energization of power switching elements 127 through 137 so that stator windings 104*a* through 104*c* of the motor 104 will be supplied with staircase three phase currents which lead the magnetic poles of a permanent-magnet rotor 104*d* of the motor 104 by a predetermined electric angle. The angular-position detector 124 comprises the rotor position sensor 30 shown in FIG. 1, and produces a signal indicative of the angular position of the rotor 28.

In the embodiment shown in FIG. 5, the power switching elements comprise N channel power MOS-FETs 127 through 132.

A booster circuit 124 comprises a boosting-type DC-to-DC converter circuit which is supplied with an output voltage from the constant-voltage regulated power supply circuit 122 and generates, at a terminal 124*a*, a boosted voltage which is higher than the voltage of the battery 102. The boosted voltage at the terminal 126*a* is applied to a power supply terminal 126*a* of an interface circuit 126. The interface circuit 126 applies the boosted voltage to the gates of the FETs 127 through 132 when the output signals at the output terminals 123*a* through 123*f* of the commutation control circuit 123 go high in level. In this embodiment, the interface circuit 126 comprises six level shifting circuits each including NPN and PNP transistors 126*a*, 126*b*, base resistors, and a resistor to be connected in series to an FET gate.

The FETs 127 through 132 are connected in a three-phase bridge configuration. The FETs 127 through 129 have drains connected to the terminal 108*a*, and the FETs 130 through 132 have sources connected to the GND terminal 103*b*. The sources of the FETs 127 through 129 and the drains of the FETs 130 through 132 are connected to terminals 103*d*, 103*e*, 103*f*.

Diodes 133 through 138 are connected reversely parallel to and between the drains and sources of the FETs 127 through 132. Diodes 139, 140, 141 are connected reversely parallel to and across the relay windings 110*b*, 112*b*, 112*c*. These diodes are current-returning diodes for absorbing surges upon switching.

If the battery 102 and the inverter device 103 are properly connected with correct polarities, when the starter switch 109 is closed, the relay 110 is actuated to close the contact 110*a* through which electric power from the battery 102 is supplied to the inverter circuit 108. Currents are supplied with suitable timing via the FETs 127 through 132 to the windings 104*a* through 104*c* of the motor 104, thus rotating the motor 104. An electric current supplied from the battery 102 causes a voltage drop across the cord 105*a* between the battery 102 and the inverter device 103. The voltage drop is detected by the differential amplifier 117 through the voltage dividers 115, 116 in the current detecting circuit 107.

If the motor 104 is shorted out or the FETs 127 through 132 malfunction, an overcurrent flows, and the output voltage of the differential amplifier 117 exceeds the predetermined reference voltage. The output signal 119*c* of the voltage comparator 119 then goes high in level, causing the latching relay driver circuit 121 to energize the operating winding 112*c* of the latching relay 112. The contact 112*a* is shifted toward the indicator circuit 114 thereby to turn on the light-emitting diode 114, thus indicating an alarm condition. When the contact 112*a* is thus shifted, the relay 110 is recovered, and the contact 110*a* is turned off, cutting off the electric power supplied to the inverter circuit 108. After the motor 104 or the FETs 127 through 132 are repaired or serviced, the recovery switch 113 is pressed to energize the recovery winding 112*b*, whereupon the contact 112*a* is shifted toward the winding 110*b* of the relay 110.

If the battery 102 and the inverter device 108 are connected with the wrong polarities, then the winding 110*b* of the relay 110 is not energized by a polarity detecting diode 111. Therefore, no reverse voltage is impressed on the inverter circuit 108, which is protected from damage.

Figure 6:
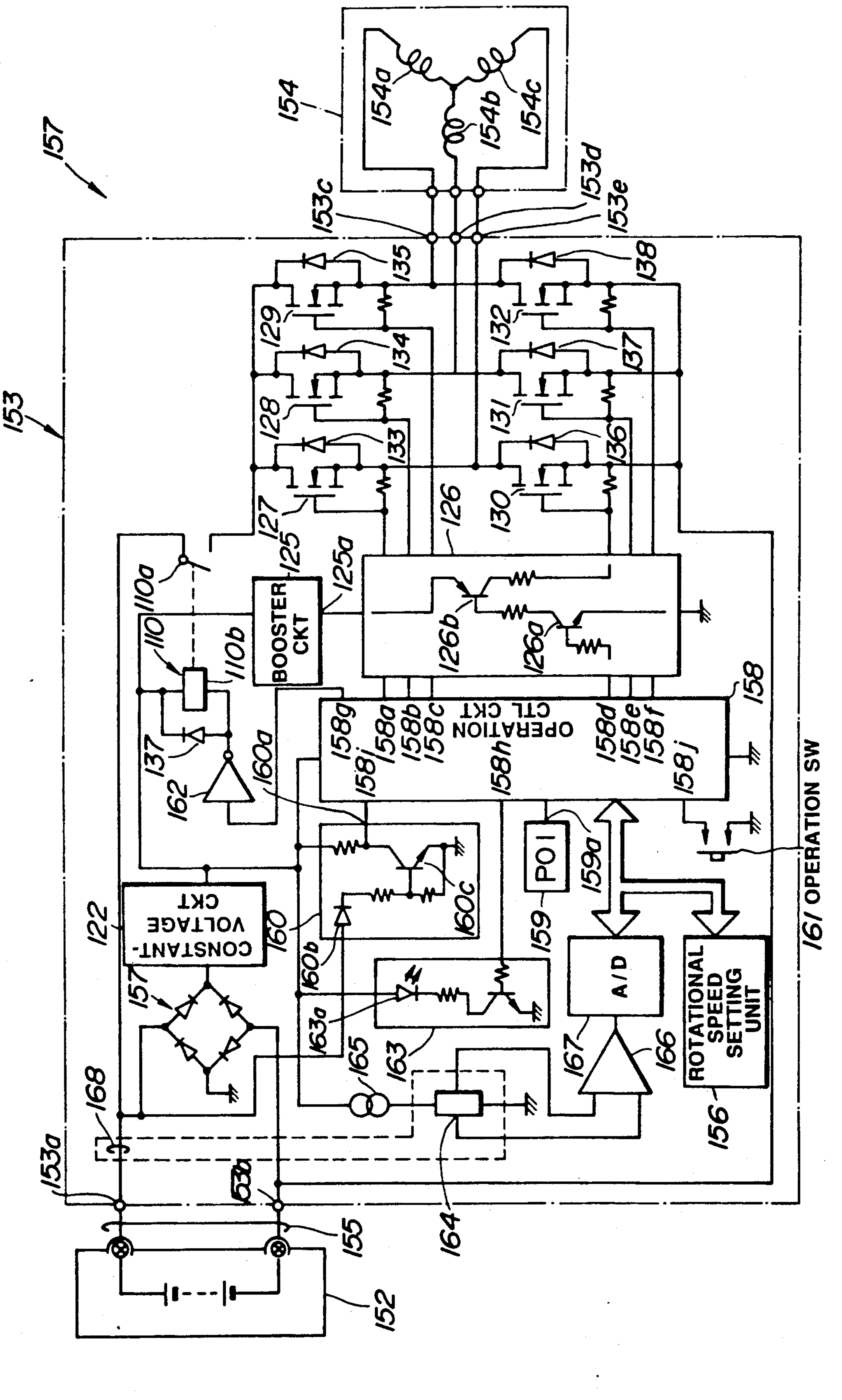
FIG. 6 is a circuit diagram, partly in block form, of an electric power supply device according to another embodiment of the present invention.

FIG. 6 shows an inverter-type electric power supply device according to another embodiment of the present invention.

The electric power supply device, generally denoted at 151, comprises a battery 152, an inverter device 153, a three-phase induction motor 154, and a pair of cables 155.

The inverter device 153 has terminals 153*a*, 153*b* connected to the battery 152 and terminals 153*c*, 153*d*, 153*e* connected to the motor 154. When the contact 110*a* of the relay 110 is closed, windings 154*a*, 154*b*, 154*c* of the motor 154 are energized through the FETs 127 through 132 with predetermined timing based on a rotational speed set by a rotational speed setting means 156.

The inverter device 153 is of basically the same construction as that of the inverter device shown in FIG. 5. Therefore, those parts of the inverter device 153 which are identical to those shown in FIG. 5 are denoted by identical reference numerals, and will not be described in detail. Only those parts different from the inverter device shown in FIG. 5 will be described below.

The inverter device 153 has two power supply systems. One of the power supply systems is a large-current supply system from the terminal 153*a* to the relay contact 110*a* to the FETs 127 through 129 to the motor 154 to the FETs 130 through 132 to the terminal 153*b*. The other power supply system is a control circuit system passing through a polarity coincidence circuit 157.

An operation control circuit 158 is supplied with stable electric power through the polarity coincidence circuit 157 from the constant-voltage regulated power supply circuit 122. The operation control circuit 158 comprises a one-chip microcomputer or dedicated ICs. When the power supply is turned on, the operation control circuit 158 is initialized by an initializing signal 159*a* from a power-on initializing (POI) circuit 159 so that all output terminals 158*a* through 158*h* are high in level. When a detected polarity output signal 160a applied from a polarity detecting circuit 160 to an input terminal 158i is high in level, the operation control circuit 158 makes effective an input signal from an operation switch 161 connected to an input terminal 158j. When the operation switch 161 is depressed, the operation control circuit 158 changes the output signal at the output terminal 158g from a low level to a high level, causing a relay driver circuit 162 to actuate the relay 110. Based on the rotational speed set by the rotational speed setting means 156, the operation control circuit 158 issues gate driving signals with predetermined timing to the gate driving signal output terminals 158a through 158f. When the operation switch 161 is pressed again, the operation control circuit 158 stops its operation.

The polarity detecting circuit 160 has a diode 160b having an anode connected to the terminal 153a and an NPN transistor 160c whose base is supplied with a base current through the diode 160b. When the positive terminal of the battery 152 is connected to the terminal 153a, the output signal 160a of the polarity detecting circuit 160 goes low in level. When the cables 155 are connected with the wrong polarities, the output signal 160a of the polarity detecting circuit 160 goes high in level. At this time, the operation control circuit 158 applies an indication output signal to an indication output terminal 158h to energize a light-emitting diode 163a of an indicator circuit 163 for thereby giving an alarm indication. The operation control circuit 158 also rejects any input signal from the operation switch 161.

While the motor 154 is in operation, an electric current is detected by a magnetic sensitive device which comprises a Hall-effect device 164 in the embodiment shown in FIG. 6. The Hall-effect device 164 is supplied with a bias current through a constant-current regulated power supply circuit 165. A Hall voltage output from the Hall-effect device 164 is amplified by an amplifier 166, and the amplified voltage is then applied to an A/D converter 167. The operation control circuit 158 energizes the A/D converter 167 at predetermined time intervals to receive data about the current being supplied from the battery 152 and compares the current data with preset data. If the current from the battery 152 is determined as an overcurrent, then the operation control circuit 158 makes the gate driver output terminals 158a through 158f low in level and also makes the relay driver output terminal 158g low in level, thereby recovering the relay 110. The operation control circuit 158 also makes the indication output terminal 158h high in level to energize the light-emitting diode 163a of the indicator circuit 163. Therefore, the condition in which the operation is stopped due to an overcurrent is visually indicated. The condition may be indicated as an audible indication, rather than the visual indication.

Figure 7:
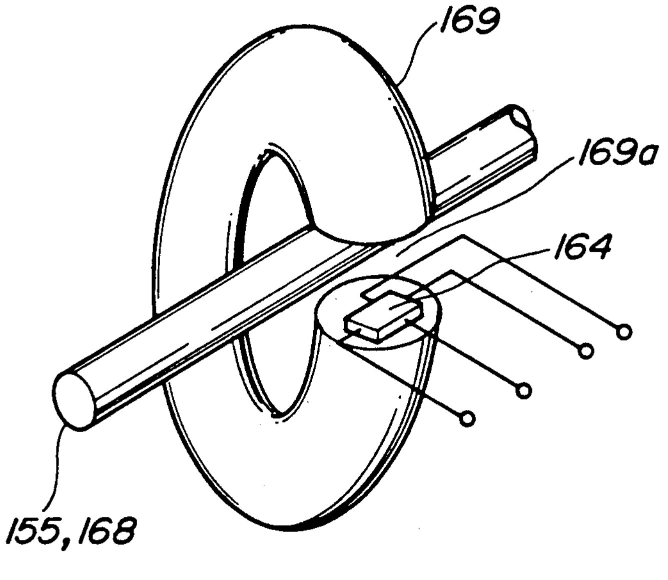
FIG. 7 is a perspective view of a current detecting means which employs a magnetic sensitive device.

FIG. 7 shows, by way of example, one arrangement of the current detecting means which comprises a magnetic sensitive device.

The Hall-effect device 164 serving as the current detecting means is disposed in a gap 169a defined in a magnetic body 169 through which one of the cables 155, or a cable 168 connected to the terminal 153a or 153b in the inverter device 153, passes.

When the battery 152 and the inverter device 153 are connected with the wrong polarities, a visual indication is given by the indicator circuit 163. Since the relay 110 is not actuated even if the operation switch 161 is pressed, no reverse voltage will not be applied to the FETs 127 through 132. While the motor 154 is in operation, the intensity of a magnetic field which is generated by the current flowing through the cable is detected by the Hall-effect device 164. Therefore, should an overcurrent flows for some reason, the inverter device 153 recovers the relay 110 to cut off the electric power supplied to the FETs 127 through 132, and the indicator circuit 163 gives a visual indication. In each of the above embodiments, power MOSFETs are employed as the power switching elements. However, power bipolar transistors may be employed as the power switching elements. The number of phases and the waveforms of output signals from the inverter-type power supply device may be varied depending on the load to which the output signals are to be supplied.

As described above, the electric current supplied from the DC power supply such as a battery through the power switching elements to the load such as a motor is detected as a voltage drop generated across the conductor such as a cable by the resistance thereof or a magnetic field produced by the current flowing through a cable and detected by a magnetic sensitive device. It is not necessary to employ any current detecting resistor in the power supply system, and the electric power can efficiently be supplied from the battery to the load. The supply of the electric power to the load can be cut off in response to detection of an overcurrent.

The switch for cutting off the supply of the electric power to the load is disposed between the DC power supply and the power switching elements. As a consequence, the current can be cut off even when the power switching elements are shorted out.

The switch for supplying and cutting off the electric power comprises a contact of a relay, and the relay is actuatable only when the DC power supply and the inverter device are properly connected to each other. In the event of an erroneous connection between the DC power supply such as a battery and the inverter device, at the time of a battery replacement, for example, the power switching elements in the inverter device can reliably be protected from damage.

An inverter-type power supply device according to another embodiment of the present invention will be described with reference to FIG. 8.

Figure 8:
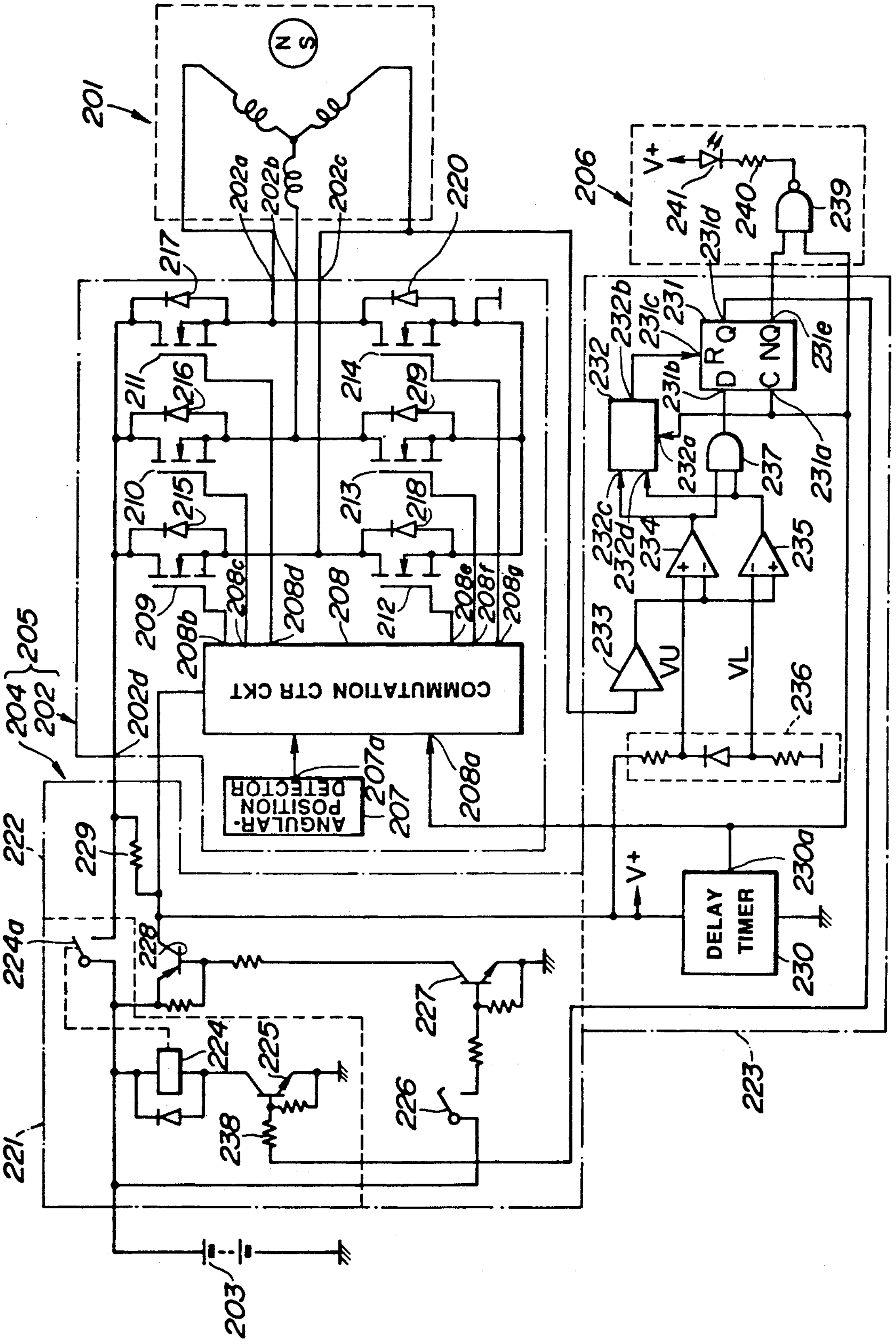
FIG. 8 is a circuit diagram, partly in block form, of an electric power supply device which is suitable for energizing a permanent magnet brushless motor having three-phase windings.

FIG. 8 shows, partly in block form, a power supply device for energizing a permanent-magnet brushless motor having three-phase windings.

The permanent-magnet brushless motor, denoted at 201, has windings connected respectively to output terminals 202a, 202b, 202c of an inverter circuit 202. A DC power supply 203 is connected through an operation control circuit 204 to an output terminal 202d of the inverter circuit 202. The inverter circuit 202 and the operation control circuit 204 serve as a motor control circuit 205. When a failure of power switching elements is detected and the motor is deenergized, an indicator circuit 206 indicates such a condition.

The inverter circuit 202 comprises a commutation control circuit 208 for generating signals to drive the power switching elements based on a detected angular position signal 207a from an angular-position detector circuit 207 which detects the angular position of the motor 201, and six power switching elements 209 through 214 which are connected in a three-phase bridge configuration. The power switching elements 209 through 214 comprise FETs, and current-returning diodes 215 through 220 are connected parallel to and between the drains and sources of the FETs 209 through 214.

The commutation control circuit 208 sets the gate drive output signals for the FETs 209 through 214 to a low level when the signal applied to an operation control input terminal 208*a* is low in level. When the signal applied to the input terminal 208*a* is high in level, the commutation control circuit 208 applies the gate drive output signals to terminals 208*b* through 208*g* with predetermined timing based on the output signal from the angular-position detector circuit 207.

The operation control circuit 204 comprises a cutoff means 221 for cutting off the electric power supplied to the inverter circuit 202, a test voltage applying means 222 for applying a current-limited voltage to the inverter circuit 202, and a voltage detecting means 223 for monitoring the voltage applied to the windings of the motor 201 to detect a malfunction of the FETs 209 through 214.

The cut-off means 221 comprises a relay 224 and a transistor 225. The relay 224 has a contact 224*a* connected between the positive terminal of the DC power supply 203 and a positive power supply terminal 202*d* of the inverter circuit 202.

The test voltage applying means 222 has an NPN transistor 227 which is turned on when an operation switch 226 is closed, and a PNP transistor 228 which is turned on when the transistor 227 is energized. The PNP transistor 228 has an emitter connected to the positive terminal of the DC power supply 203, and a collector connected through a current-limiting resistor 229 to the positive power supply terminal 202*d* of the inverter circuit 202. The electric power is supplied from the collector of the PNP transistor 228 to the commutation control circuit 208, the voltage detecting means 223, and the indicator circuit 206.

The voltage detecting means 223 has a delay timer circuit (or power-on initializing circuit) 230 for holding a low-level output signal until a predetermined period of time elapses after the voltage detecting means 223 is energized, and for holding a high-level output signal after the elapse of the predetermined period of time. The delay timer circuit 230 has an output terminal 230*a* connected to the operation control input terminal 208*a* of the operation control circuit 208, a clock input terminal 231*a* of a flip-flop (F/F) 231, an input terminal 232*a* of an applied voltage period detecting circuit 232, and an indicator circuit 206. In the illustrated embodiment, the delay timer circuit 230 serves as an automatic testing means.

The voltage detecting means 223 also has various circuits for detecting a voltage to be applied to the windings of the motor 201. The voltage to be applied to the motor windings is applied through a voltage follower circuit 233 having a very high input impedance to first and second voltage comparators 234, 235.

The first and second voltage comparators 234, 235, a threshold voltage generator circuit 236, and an AND gate 237 jointly constitute a window comparator circuit.

The threshold voltage generator circuit 236 is arranged to produce an upper-limit threshold voltage VU and a lower-limit threshold voltage VL. The upper-limit threshold voltage VU is applied to a noninverting input terminal of the first voltage comparator 234, whereas the lower-limit threshold voltage VL is applied to an inverting input terminal of the second voltage comparator 235. The output terminals of the voltage comparators 234, 235 are connected to the input terminals of the AND gate 237 whose output terminal is coupled to a data (D) input terminal 231*b* of the F/F 231.

In the embodiment of FIG. 8, the upper-limit threshold voltage VU is lowered to about $\frac{2}{3}$ of the voltage which is applied to the inverter circuit 202 through the test voltage applying means 222, and the lower-limit threshold voltage VL is lowered to about $\frac{1}{3}$ of the same voltage.

The applied voltage period detecting means 232 produces a high-level output signal at its output terminal 232*b* if the output signals of the first and second voltage comparators 234, 235 do not periodically repeat high- and low-levels when the output signal applied from the delay timer circuit 230 to the input terminal 232*a* is high in level. The applied voltage period detecting means 232 comprises a circuit for detecting a positive- or negative-going edge of the signals applied to applied voltage period input terminals 232*c*, 232*d*, and a timer circuit which is reset by a detected output from the positive- or negative-going edge detecting circuit. The applied voltage period detecting means 232 has an output terminal 232*b* connected to a reset (R) input terminal 231*c* of the F/F 231.

The F/F 231 has a Q output terminal 231*d* coupled to the base of a relay driver transistor 225 through a base resistor 238. The F/F 231 also has an NQ output terminal 231*e* connected to an input terminal of a NAND gate 239 of the indicator circuit 206.

The indicator circuit 206 has a current-limiting resistor 240 connected to the output terminal of the NAND gate 239 and a light-emitting diode 241 connected to the current-limiting resistor 240. When any one of the FETs 209 through 214 of the inverter circuit 202 is shorted out or otherwise malfunctions, the indicator circuit 206 gives a visual indication of such a failure.

The failure may be indicated by an audible indication produced by a speech synthesizer or the like, rather than the visual indication.

Operation of the power supply device 205 will be described below. When the operation switch 226 is closed, the transistors 227, 228 are turned on, allowing the voltage of the DC power supply 203 to be applied to the inverter circuit 202 through the resistor 229. With the transistor 228 energized, the electric power is also applied to the voltage detecting means 223, and the output signal from the delay timer circuit 230 is kept at a low level for a certain period of time. Therefore, the commutation control circuit 208 sets all the gate drive output signals to a low level, and the FETs 209 through 214 are de-energized. The voltage applied to one of the windings of the motor 201 at this time is applied to the voltage comparators 234, 235 through the voltage follower circuit 233. If the voltage applied to the motor winding is the same as or close to the positive or negative potential of the DC power supply 203, then the output signal of the AND gate 237 goes low. If any of the FETs 209 through 214 does not fail, the output signal from the AND gate 237 is high since the voltage applied to the motor winding is about $\frac{1}{2}$ of the voltage of the DC power supply 203 (as the leak resistances of the FETs are substantially equal to each other).

Upon elapse of a predetermined delay time set by the delay timer circuit 230, the output signal 230*a* of the delay timer circuit 230 changes from the low level to the high level, and the output signal from the AND gate 237 is stored in the F/F 231 at this positive-going timing. Therefore, in the absence of a failure of any of the FETs 209 through 214, the output signal from the window comparator (i.e., the AND gate 237) is high in level and stored in the F/F 231 The output signal at the Q terminal 231*d* goes high, turning on the transistor 225 thereby to actuate the relay 224. The contact 224*a* of the relay 224 is closed to allow the voltage of the DC power supply 203 to be applied directly to the inverter circuit 202. The input signal applied to the operation control input terminal 208*a* of the commutation control circuit 208 goes low, and the FETs 209 through 214 are periodically turned on and off to rotate the motor 201.

If any one of the FETs 209 through 214 is shorted out or fails, the output signal from the F/F 231 goes low, and the relay 224 is not actuated. Therefore, the motor 201 is not energized, and such an FET malfunction is visually indicated.

If any failure of the FETs 209 through 214 is not detected when the voltage is checked at the time of starting to operate the motor 201, but any one of the FETs 209 through 214 is shorted out or fails after the motor 201 is operated, then the output signal 232*b* of the applied voltage period detecting means 232 goes high, resetting the F/F 231. The output signal from the Q output terminal 231*d* of the F/F 231 goes low, and the relay 224 is recovered to cut off the supply of the electric power from the DC power supply 203 to the inverter circuit 202. Since the output signal from the NQ output terminal 231*e* of the F/F 231 goes low, the light-emitting diode 241 is energized to give a vidual indication of the FET failure.

In this embodiment, the voltage applied to one of the three-phase windings of the motor 201 is detected. However, the voltages applied to all the windings may be detected. With such a modification, as many voltage detecting means 223 as the number of the motor windings may be employed, or an input selector circuit may be employed to enable the single voltage detecting means 223 to detect the voltages of the motor windings successively. The cut-off means 221 may be a semiconductor switch or the like, instead of the relay 224.

Rather than applying the voltage of the DC power supply 203 to the test voltage applying means 222, a voltage equal to the maximum rated voltage of the power switching elements may be applied from another power supply to check the dielectric breakdown voltage of the power switching elements, as well as whether the power switching elements are suffering a failure.

An AC voltage may also be applied as a test voltage in addition to the DC voltage, to determine whether the characteristics of the power switching elements, including the capacity thereof, are normal.

Figure 9:
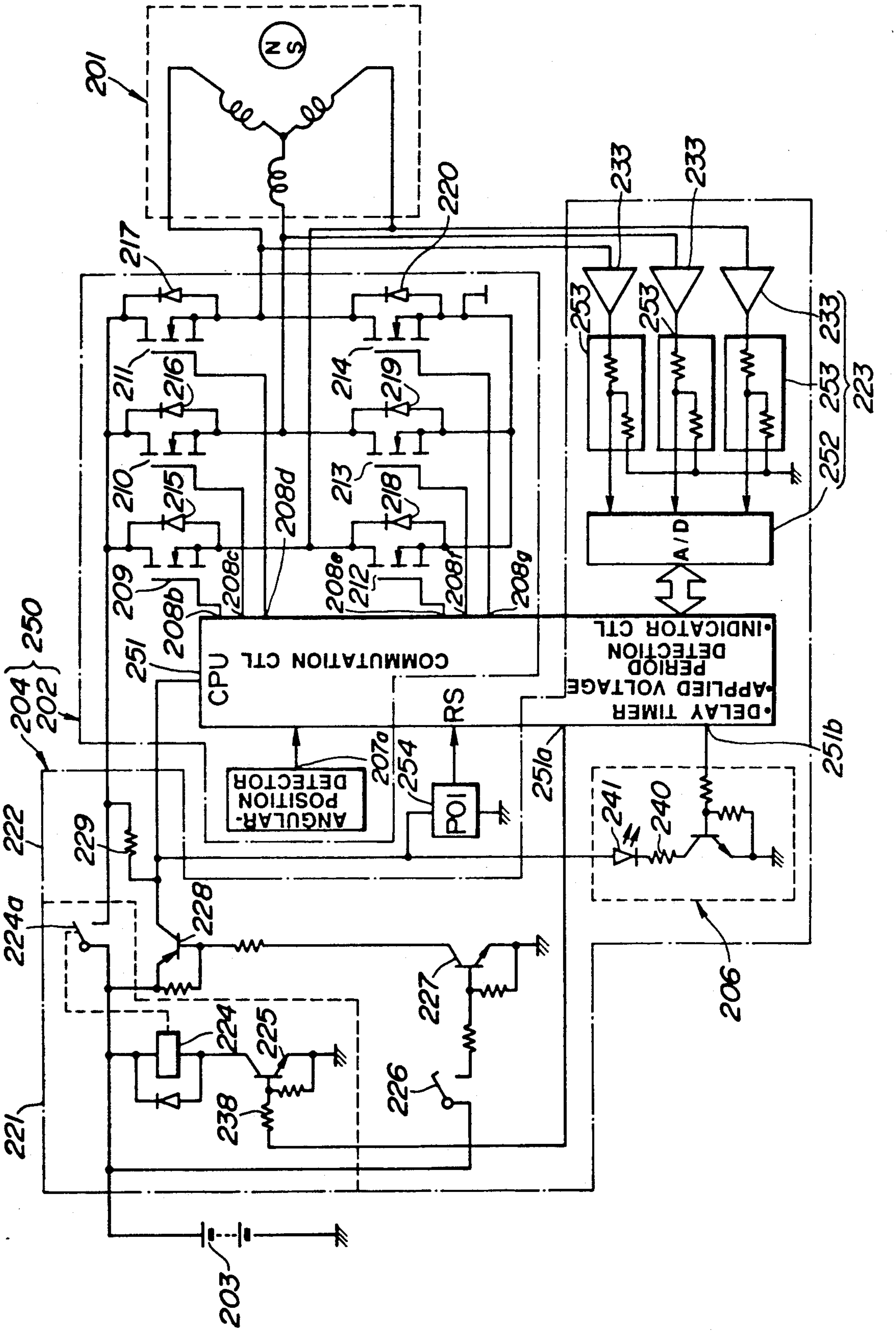
FIG. 9 is a circuit diagram, partly in block form, of an electric power supply device according to still another embodiment of the present invention.

FIG. 9 shows, partly in block form, an electric power supply device according to still another embodiment of the present invention.

The power supply device, designated at 250, includes a commutation control circuit 251 which is the same as the commutation control circuit 203 shown in FIG. 8, except that the commutation control circuit 251 is in the form of a one-chip microcomputer (CPU). The power supply device 250 also includes an A/D converter 252 combined with a multiplexer, for detecting voltages applied to the windings of the motor 201. The voltages applied to the motor windings are supplied through high-impedance voltage follower circuits 233 and voltage dividers 253 to the A/D converter 252. The delay timer circuit 230, the applied voltage period detecting means 232, and the indicator circuit 206 shown in FIG. 8 are software-implemented by the CPU 251.

When the operation switch 226 is closed, the electric power from the DC power supply 203 is applied through the transistor 228 to the CPU 251, which is initialized by a power-on initializing circuit (POI) 254. The CPU 251 then successively read, through the A/D converter 252, data indicative of voltages which are applied to the windings of the motor 201 according to the voltage applied through the current-limiting resistor 229 to the inverter circuit 202. If the voltage data fall within a predetermined range, then the CPU 251 produces a high-level output signal at an output port 251*a* to actuate the relay 224. The FETs 209 through 214 are then turned on to energize the motor 201. If the voltage data read from the A/D converter 252 fall outside the predetermined range, then the CPU 251 keeps a low signal level at the output port 251*a*. The supply of electric power to the inverter circuit 202 is now cut off. The CPU 251 applies a high-level signal to an output port 251*b* to energize the light-emitting diode 241 of the indicator circuit 206.

While the motor 201 is in operation, the CPU 251 also reads data indicative of the voltages applied to the motor windings through the A/D converter 252 for checking whether the inverter circuit 202 malfunctions or not. If any malfunction is detected, the CPU 251 makes the output signal at the output port 251*a* low, thereby recovering the relay 224 to stop the operation of the motor 201. The CPU 251 also energizes the indicator circuit 206 to indicate the detected malfunction. The CPU 251 may compare the gate drive output signals 208*b* through 208*g* for the FETs 209 through 214 with the winding voltage data to detect an FET short circuit or conduction failure. Alternatively, the CPU 251 may detect a characteristic degradation of the FETs as well as a failure thereof based on a difference in time between the gate drive output signals and the voltages applied to the motor windings, or the values of voltages applied to the motor windings.

While the present invention is described with respect to a permanent-magnet brushless motor having three-phase windings in each of the above embodiments, the motor control circuit of the invention may be employed in combination with any of various motors such as an induction motor.

With the power supply device of the invention, while the power switching elements are being de-energized, a malfunction such as a short circuit or failure of the power switching elements is detected on the basis of voltages applied to the winding of the motor. If a malfunction is detected, then the supply of electric power to the power switching elements is cut off. Therefore, before the motor starts to operate, it is possible to detect a short circuit, an insulation reduction, or other failures of the power switching elements, and hence undesirable power consumption is prevented. Moreover, the inverter circuit is prevented from being excessively heated by an overcurrent, and the DC power supply is also prevented from being damaged by an overcurrent.

The applied voltage period detecting means is provided which monitors a periodic change in the voltages applied to the motor windings. Therefore, even while the motor is in operation, it is possible to detect any failure of the power switching elements and stop the operation of the motor. The applied voltage period detecting means does not cause any electric power loss unlike the conventional arrangement in which an overcurrent detecting resistor is connected in series to the inverter circuit. Consequently, the electric power supplied to the windings of the motor is not reduced by the applied voltage period detecting means.

Since any malfunction of the power switching elements is detected utilizing a very small leak current in the power switching elements, any voltage drop across the motor windings can be neglected almost entirely. Even if the motor has polyphase windings, all the power switching elements can be checked for malfunctioning simply by detecting the voltage applied to one of the motor windings. As an advantage, the motor control circuit may be reduced in size and cost.

Although there have been described what are at present considered to be the preferred embodiments of the present invention, it will be understood that the invention may be embodied in other specific forms without departing from the essential characteristics thereof. The present embodiments are therefore to be considered in all aspects as illustrative, and not restrictive. The scope of the invention is indicated by the appended claims rather than by the foregoing description.

We claim:

1. An engine starter and electric generator system for transmitting rotative power to a crankshaft to start an engine and generating electric power based on rotative power from the crankshaft, comprising:

a starter/generator operable selectively as a starter motor to produce the rotative power and a generator for generating the electric power;

electric power supply means for supplying electric power to said starter motor;

power transmitting means operatively interconnecting the crankshaft and said starter/generator, for bidirectionally transmitting the rotative power between the crankshaft and said starter/generator;

a transmission mechanism disposed in said power transmitting mechanism, for changing the speed of rotation transmitted between the crankshaft and the starter/generator; said transmission mechanism including, a planetary gear mechanism composed of a sun gear, a carrier, a plurality of planet gears rotatably supported on said carrier and meshing with said sun gear, and a ring gear meshing with said planet gears, one of said sun gear, said carrier, and said ring gear serving as a control element, the speed-reduction ratio of said transmission mechanism being variable when said control element is locked and released; a ratchet mechanism comprising an engageable portion on said control element, and a locking pawl supported for engagement with said engageable portion for preventing rotation of said control element only in one direction; an electrical actuator operated by said control means for moving said locking pawl into engagement with said engageable portion; and electrical control means for electrically controlling operation of said starter/generator and establishing different speed-reduction ratios for said transmission mechanism when said starter/generator operates as the generator and when said starter/generator operates as the starter motor.

2. An engine starter and electric generator system according to claim 1, wherein said control means comprises means for operating said starter/generator as the starter motor after the speed-reduction ratio for starting the engine is established for said transmission mechanism.

3. An engine starter and electric generator system according to claim 1, wherein said starter/generator has a rotor connected to said power transmitting means, said rotor serving as a rotor of each of said starter motor and said generator.

4. An engine starter and electric generator system according to claim 1, wherein said transmission mechanism comprises means for reducing the speed of the rotative power from said starter motor and transmitting the reduced-speed rotative power to the crankshaft.

5. An engine starter and electric generator system according to claim 1, wherein said transmission mechanism comprises means for transmitting the rotative power from the crankshaft directly to the generator when said starter/generator operates as the generator.

6. An engine starter and electric generator system according to claim 1, wherein said actuator comprises a solenoid-operated actuator for moving said locking pawl under a force depending on the magnitude of an electric current supplied to the solenoid-operated actuator, said control means comprising means for supplying said solenoid-operated actuator alternately with larger and smaller currents at predetermined periods.

7. An engine starter and electric generator system according to claim 6, wherein said control means comprises means for starting to energize said starter/generator during a first period in which the larger current is supplied to said solenoid-operated actuator.

8. An engine starter and electric generator system according to claim 1, wherein said transmission mechanism further comprises a one-way clutch for transmitting the rotative power only from the crankshaft to said starter/generator, said one-way clutch being interposed between the other two of said sun gear, said carrier, and said ring gear, except for said one as the control element.

9. An engine starter and electric generator system for transmitting rotative power to a crankshaft to start an engine and generating electric power based on rotative power from the crankshaft, comprising:

a starter/generator operable selectively as a starter motor to produce the rotative power and a generator for generating the electric power;

electric power supply means for supplying electric power to said starter motor; said electric power supply means including, a DC power supply, an inverter device having power switching elements, and a cable interconnecting said DC power supply and said inverter circuit, said inverter device comprising:

current detecting means for detecting a current flowing through one of either said interconnecting cable or a cable in said inverter device; and current cut-of means for comparing the value of the current detected by said current detecting means with a predetermined current value and cutting of the supply of electric power to said power switching elements if the value of the current detected by said current detecting means exceeds said predetermined current value;

power transmitting means operatively interconnecting the crankshaft and said starter/generator, for bidirectionally transmitting the rotative power between the crankshaft and said starter/generator;

a transmission mechanism disposed in said power transmitting mechanism, for changing the speed of rotation transmitted between the crankshaft and the starter/generator; and electrical control means for electrically controlling operation of said starter/generator and establishing different speed-reduction ratios for said transmission mechanism when said starter/generator operates as the generator and when said starter/generator operates as the starter motor.

10. An engine starter and electric generator system according to claim 9, wherein said current cut-off means comprises a current cut-off relay interposed between said DC power supply and said power switching elements, for disconnecting said DC power supply and said power switching elements from each other if the value of the current detected by said current detecting means exceeds said predetermined current value.

11. An engine starter and electric generator system according to claim 10, wherein said current cut-off means has polarity detecting means for actuating said relay to allow electric power to be supplied from said DC power supply to said power switching elements only when said DC power supply is connected to said inverter device with correct polarities.

12. An engine starter and electric generator system according to claim 9, wherein said first-mentioned cable has a current detecting resistance, said current detecting means having a voltage comparator for comparing a voltage drop produced across said first-mentioned cable by said current detecting resistance with a predetermined reference voltage.

13. An engine starter and electric generator system according to claim 9, wherein said current detecting means has a magnetic responsive device for detecting the intensity of a magnetic field generated by a current flowing through said first-mentioned cable or said cable in said inverter device.

14. An engine starter and electric generator system according to claim 1, wherein said electric power supply means comprises an inverter circuit having power switching elements, said inverter circuit comprising:

an operation control circuit for detecting a voltage applied to said starter motor while said power switching elements are being de-energized, and for cutting off the supply of electric power to said inverter circuit if the detected voltage falls outside a predetermined voltage range.

15. An engine starter and electric generator system according to claim 14, wherein said operation control circuit has test voltage applying means for applying a voltage, with a maximum current limited, to said inverter circuit while said power switching elements are being de-energized.

16. An engine starter and electric generator system according to claim 15, wherein said operation control circuit has automatic testing means for de-energizing all said power switching elements and detecting a voltage applied to said starter motor when said starter motor starts being operated.

17. An engine starter and electric generator system according to claim 14, wherein said operation control circuit comprises an applied voltage period detecting means for generating a signal to cut off the supply of electric power to said inverter circuit when a voltage applied to said starter motor does not periodically vary, while electric power is being supplied through said inverter circuit to said starter motor.

18. An engine starter and electric generator system according to claim 14, wherein said operation control circuit comprises means for applying a DC voltage to said inverter circuit, detecting a voltage produced across one of a plurality of windings of the starter motor, and cutting off the supply of electric power to said inverter circuit when the detected voltage falls outside a predetermined voltage range.

* * * * *